O. T. BUGG.
TIRE OR TUBE FOR WHEELED VEHICLES.
APPLICATION FILED JAN. 16, 1913.
1,073,329.
Patented Sept. 16, 1913.
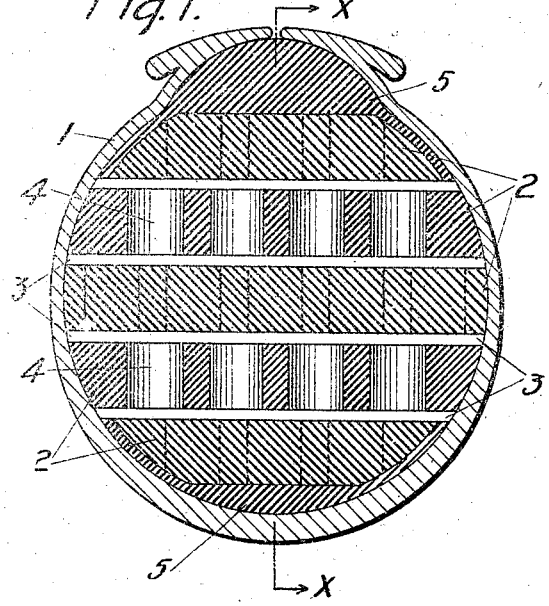
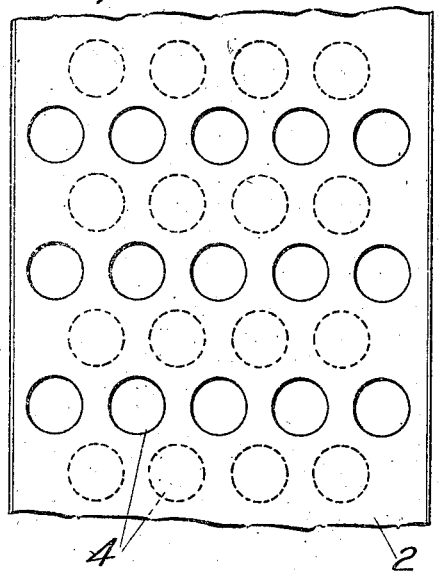
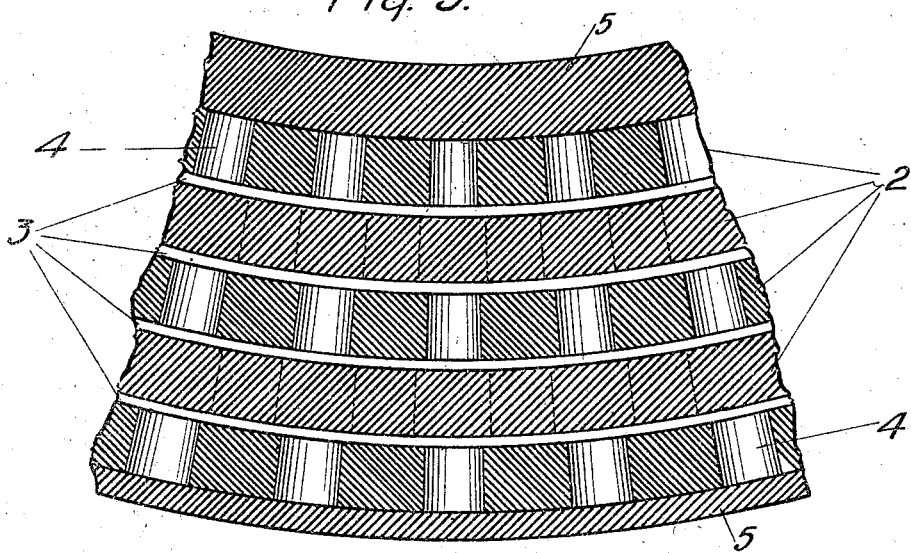
WITNESSES
M. F. Keating
Alfred O. Tate
INVENTOR
Owen T. Bugg.
BY Charles J. Kintner.
ATTORNEY

UNITED STATES PATENT OFFICE.

OWEN T. BUGG, OF HOBOKEN, NEW JERSEY.

TIRE OR TUBE FOR WHEELED VEHICLES.

1,073,329. Specification of Letters Patent. Patented Sept. 16, 1913.

Application filed January 16, 1913. Serial No. 742,331.

*To all whom it may concern:*

Be it known that I, OWEN T. BUGG, a citizen of the United States, and a resident of Hoboken, county of Hudson, and State of New Jersey, have made a new and useful Invention in Tires or Tubes for Wheeled Vehicles, of which the following is a specification.

My invention is directed particularly to what is known in the art as tire tubes adapted to be used in connection with auto cars, trucks and the like, and which are subjected to terrific strains and pressures when running at great speeds and when carrying relatively heavy loads.

The invention will be understood by referring to the accompanying drawings, in which, Figure 1 is a vertical sectional view through one form of my invention illustrating it as combined with an outer tire or shoe. Fig. 2 is a plan view looking upward at Fig. 1 upon the supposition that the outer tire or shoe and also a portion of the inner tire are removed. Fig. 3 is a longitudinal section of Fig. 1 on the line X—X and as seen looking thereat from left to right in the direction of the arrows, showing also a portion of the complete tire as it would appear in circular form when completed.

My invention consists in making a tire for wheeled vehicles of superimposed concentric layers of soft rubber, the alternate layers being respectively perforated and unperforated, and the whole sealed together by a self-sealing cement, or by any well known equivalent means adapted to seal the open ends of the perforations, so as to constitute hermetically sealed cells, and in joining the ends of the layers together around the wheel. This tire may be used either as a complete operative tire or as an inner tire or tube, as preferred.

In order that my invention may be fully understood so that those skilled in the art may construct and use the same, reference is had to the accompanying drawings in which I have shown a preferred form.

1 (Fig. 1) represents an outer vehicle tire or shoe of well known form, made of the usual material and adapted to be applied to a vehicle felly in the well known manner, the inner tire which constitutes my invention being made of a series of strips of soft rubber or equivalent yielding material 2, 2, 2, there being five of such strips shown.

The perforations 4 in these strips may alternate in succession, as shown in all of the figures of the drawings, and particularly in Fig. 2, by dotted circles and full circles, and are then separated from each other by corresponding thinner strips of flexible material 3, 3, 3 and are arranged in connection with top and bottom strips 5, 5 of the conformation shown.

In constructing this tube after the perforations 4 have been made the strips 2 and 3 are all secured together in alternate relation by any well known method of sealing, as by self-sealing cement, and the joints made absolutely air tight by any preferred method of hermetical sealing. This tube as thus composed has its ends joined together by sealing it in any preferred manner so as to make a complete circular tube having hermetically sealed cells radially located in such manner as to give the best elasticity from the material from which it is made, and also in such manner that the elastic effect of atmospheric air at normal pressure is utilized, it being understood that my novel tube is distinctly a tube designed for use with the confined air in the cells at normal air pressure only.

I do not limit myself to the especial form of structure shown in the accompanying drawings as the same may be departed from in many instances and still come within the terms of my claims hereinafter made, but I do lay special importance upon the construction of a tube in which a series of openings 4, 4, 4 are employed with their diameters extending in radial directions of the tube in contradistinction to a tube in which the openings run lengthwise thereof.

I am aware that tubes have heretofore been constructed in which there were arranged a series of radial holes running from a point near the diameter of the tube to the surface thereof and then covering the same with flexible material.

I am also aware that tubes have heretofore been made of relatively soft rubber or other flexible material having a multiplicity of holes running concentric with the diameter of the tube, and I lay claim to no such structure, my invention being directed to a cellular tire in which the individual cells thereof are radially located and rendered capable of utilizing the elasticity of the air and 11 the material of which the tube is made in the best possible manner.

Having thus described my invention what I claim and desire to secure by Letters Patent of the United States is—

1. A tire for wheeled vehicles comprising superimposed concentric layers of soft rubber, the alternate layers of which are provided with radially extending perforations, and the intermediate layers secured to the adjacent faces of the first-mentioned layers and adapted to seal the open ends of said perforations.

2. A tire for wheeled vehicles comprising superimposed concentric layers of soft rubber, the alternate layers of which are provided with radially extending perforations; and the intermediate layers secured to the adjacent faces of the first-mentioned layers and adapted to seal the open ends of said perforations; the perforations in the alternate layers being staggered with relation to each other.

In testimony whereof I have signed my name to this specification in the presence of two subscribing witnesses.

OWEN T. BUGG.

Witnesses:
  C. J. KINTNER,
  M. F. KEATING.